US010029247B2

(12) United States Patent
Ariga et al.

(10) Patent No.: US 10,029,247 B2
(45) Date of Patent: Jul. 24, 2018

(54) CHABAZITE-TYPE ZEOLITE AND PROCESS FOR PRODUCING THE SAME

(75) Inventors: Ko Ariga, Yamaguchi (JP); Hidekazu Aoyama, Yamaguchi (JP)

(73) Assignee: TOSOH CORPORATION, Yamaguchi (JP)

(*) Notice: Subject to any disclaimer, the term of this patent is extended or adjusted under 35 U.S.C. 154(b) by 1510 days.

(21) Appl. No.: 13/139,591

(22) PCT Filed: Dec. 21, 2009

(86) PCT No.: PCT/JP2009/071260
§ 371 (c)(1),
(2), (4) Date: Jun. 14, 2011

(87) PCT Pub. No.: WO2010/074040
PCT Pub. Date: Jul. 1, 2010

(65) Prior Publication Data
US 2011/0251048 A1    Oct. 13, 2011

(30) Foreign Application Priority Data

Dec. 22, 2008   (JP) .............................. 2008-325404

(51) Int. Cl.
| | |
|---|---|
| *B01J 29/06* | (2006.01) |
| *B01J 39/14* | (2006.01) |
| *B01J 37/03* | (2006.01) |
| *B01D 53/02* | (2006.01) |
| *B01J 20/18* | (2006.01) |
| *B01J 20/28* | (2006.01) |
| *B01J 29/70* | (2006.01) |
| *C01B 39/48* | (2006.01) |

(52) U.S. Cl.
CPC .............. *B01J 39/14* (2013.01); *B01D 53/02* (2013.01); *B01J 20/18* (2013.01); *B01J 20/28004* (2013.01); *B01J 29/7015* (2013.01); *B01J 37/031* (2013.01); *B01J 37/036* (2013.01); *C01B 39/48* (2013.01); *B01D 2253/108* (2013.01); *B01D 2253/1085* (2013.01); *B01D 2253/304* (2013.01); *B01D 2255/50* (2013.01)

(58) Field of Classification Search
CPC ..... C01B 39/48; B01J 29/7015; B01J 37/031; B01J 37/036; B01D 2255/50
USPC ...................... 502/60, 76; 423/700, 704, 706
See application file for complete search history.

(56) References Cited

U.S. PATENT DOCUMENTS

| | | | |
|---|---|---|---|
| 3,030,181 A | 4/1962 | Milton | |
| 4,496,786 A | 1/1985 | Santilli et al. | |
| 4,544,538 A * | 10/1985 | Zones | 423/706 |
| 4,665,110 A | 5/1987 | Zones | |
| 6,353,146 B1 | 3/2002 | Williams | |
| 6,488,741 B2 | 12/2002 | Olson | |
| 6,702,797 B2 | 3/2004 | Williams | |
| 6,709,644 B2 | 3/2004 | Zones et al. | |
| 7,033,969 B1 | 4/2006 | Jobson et al. | |
| 7,067,108 B2 | 6/2006 | Mertens et al. | |
| 7,601,662 B2 * | 10/2009 | Bull et al. | 502/60 |
| 2003/0069449 A1 | 4/2003 | Zones et al. | |
| 2003/0089227 A1 | 5/2003 | Hasse et al. | |
| 2005/0197520 A1 | 9/2005 | Mertens et al. | |
| 2006/0115403 A1 * | 6/2006 | Yuen | 423/239.2 |
| 2008/0027259 A1 | 1/2008 | Roth et al. | |
| 2008/0202107 A1 * | 8/2008 | Boorse et al. | 60/301 |
| 2008/0226545 A1 * | 9/2008 | Bull et al. | 423/700 |
| 2008/0241060 A1 * | 10/2008 | Li et al. | 423/700 |
| 2010/0003178 A1 | 1/2010 | Tokunaga et al. | |
| 2010/0092362 A1 * | 4/2010 | Li et al. | 423/239.2 |
| 2011/0076229 A1 | 3/2011 | Trukhan et al. | |
| 2011/0136657 A1 | 6/2011 | Takamitsu et al. | |

(Continued)

FOREIGN PATENT DOCUMENTS

| | | |
|---|---|---|
| GB | 868846 | 5/1961 |
| JP | 60-92221 | 5/1985 |
| JP | 05-078266 | 3/1993 |

(Continued)

OTHER PUBLICATIONS

China Office action, dated Oct. 10, 2012 along with an english translation thereof.
Christian Baerlocher et al., "Atlas of Zeolite Framework Types", Structure Commission, Fifth Revised Edition, 2007, pp. 96-97.
"Gas Chromatographic separation of Meta and Para-Xylenes in Aromaic Mixtures", Nature, vol. 181, 1958, pp. 1794-1796.
Cabanas et al., "Synthesis and structure of pure SIO2 polymorph with the lowest framework density", Chem Commun, 1998, pp. 1881-1882.
Office Action dated Jun. 20, 2013 in Chinese Application 200980151287.5.
Search report from E.P.O., dated Sep. 18, 2013.
Japan Office action, dated Oct. 22, 2013 along with an english translation thereof.

(Continued)

*Primary Examiner* — Elizabeth D Wood
(74) *Attorney, Agent, or Firm* — Greenblum & Bernstein, P.L.C.

(57) ABSTRACT

A subject for the invention is to provide a chabazite-type zeolite that is expected to have durability and thermal resistance, which are practical properties required of catalyst supports and adsorbent bases, and that has profitability. A chabazite-type zeolite having an $SiO_2/Al_2O_3$ molar ratio of 15-50 and an average particle diameter size of 1.5 μm or more has high durability and high thermal resistance. Such a chabazite-type zeolite can be produced by crystallizing a starting-material composition in which the molar ratios of a structure-directing agent and water to $SiO_2$ satisfy 0.05≤(structure-directing agent)/$SiO_2$<0.13 and 5≤$H_2O/SiO_2$<30, in the presence of at least one kind of alkali metal ions selected from the group consisting of K, Rb, and Cs. The structure-directing agent preferably is an N,N,N-trimethyl-adamantaneammonium salt.

6 Claims, 1 Drawing Sheet

(56) References Cited

U.S. PATENT DOCUMENTS

2011/0182790 A1\* 7/2011 Chandler et al. .......... 423/213.5
2012/0244066 A1\* 9/2012 Bull et al. .................... 423/703

FOREIGN PATENT DOCUMENTS

| JP | 08-059566 | 3/1996 |
| JP | 09-124578 | 5/1997 |
| JP | 2001-525241 | 12/2001 |
| JP | 2002-512083 | 4/2002 |
| JP | 2005-503260 | 2/2005 |
| JP | 2007-534582 | 11/2007 |
| WO | 2005/063622 | 7/2005 |
| WO | 2010/043891 | 4/2010 |

OTHER PUBLICATIONS

S.I. Zone et al., Sequence of high silica zeolites found during synthesis experiments in the presence of a quaternary adamantammoniumcation, Zeolites: Facts, Figures, Future, Elsevier Science Publishers B.V., 1989, pp. 299-309.
S.I. Zone et al., Novel zeolite transformation: The template-mediated conversion of cubic P zeolite to ssz-13, Zeolite, May 1988, vol. 8, pp. 166-174.
Chinese Office Action dated Mar. 4, 2014 with English translation for Chinese Application No. 200980151287.5.

\* cited by examiner

CHABAZITE-TYPE ZEOLITE AND PROCESS FOR PRODUCING THE SAME

TECHNICAL FIELD

The present invention relates to a chabazite-type zeolite having a high silica content and a large crystal size, and a process for producing the zeolite.

BACKGROUND ART

Chabazite-type zeolites are zeolites having a three-dimensional pore structure constructed of 8-membered oxygen rings of 3.8×3.8 Å, and are designated and classified as the structure type code CHA, as zeolites having a fully identified crystal structure, by International Zeolite Association (non-patent document 1).

Chabazite-type zeolites are known as naturally occurring zeolites and typically have the composition $Ca_6^{2+}$ $[Si_{24}Al_{12}O_{72}]$ (non-patent document 2). Examples of synthetic zeolites of the chabazite type include zeolite D disclosed in patent document 1 and zeolite R disclosed in patent document 2, each zeolite having an $SiO_2/Al_2O_3$ ratio of 3.45-4.9.

In patent document 3 and patent document 4 are disclosed a zeolite of the so-called high-silica chabazite type having an $SiO_2/Al_2O_3$ ratio of 5-50, which is designated as SSZ-13, and methods for synthesizing the zeolite.

In patent document 5 is disclosed a chabazite-type zeolite having an $SiO_2/Al_2O_3$ ratio of 20-50 and a crystal diameter of 0.5 μm or less, which is designated as SSZ-62. Furthermore, patent document 6 and non-patent document 3 disclose that a chabazite-type zeolite having an $SiO_2/Al_2O_3$ ratio of 100 or greater can be synthesized by adding fluorine.

Synthetic zeolites have regularly arranged pores having a uniform size which are due to the crystal structure thereof. Using the pore structures, synthetic zeolites are industrially used as desiccants, adsorbents for adsorbing various inorganic or organic molecules on the basis of differences in polarity and molecular diameter, solid acid catalysts, etc. For example, chabazite-type zeolites also are known to be usable as catalysts for chemically converting an oxygenic organic compound, e.g., an alcohol, into a lower olefin (patent document 6 and patent document 7). Other uses thereof which have been disclosed include an adsorptive separating agent for purifying 1,1,1,2-tetrafluoroethane (HFA134a) contained in a mixture of HFA134a and 1-chloro-2,2-difluoroethylene (HCFC 1122) (patent document 8), an adsorptive separating agent for separating the propylene from the propane by adsorbing propylene on the zeolite from a mixture of propylene and propane (patent document 9), an adsorptive separating agent for separating oxygen, carbon dioxide, or helium from a mixture thereof with nitrogen (patent document 10), a catalyst for synthesizing a methylamine compound (patent document 11), a catalyst for producing acetonitrile through ammoxidation of ethane (patent document 12), a catalyst for selective reduction of nitrogen oxides with hydrocarbon in automobile exhaust gas (patent document 13), an odor absorbent for use in fibrous members constituting sanitary articles (patent document 14), etc.

As described above, chabazite-type zeolites are expected to be utilized in a variety of application, in particular, as adsorbents and catalyst supports. However, for industrial uses, the zeolites must have durability required of adsorbents or catalyst supports. For example, for use in an adsorption/desorption process involving a thermal regeneration step, the zeolites are required not to decrease in adsorption performance even when repeatedly heated. Meanwhile, the catalysts for use in exhaust gas purification are required to have thermal durability which enables the catalysts to retain their catalytic performance at high temperatures. There has hence been a desire for a chabazite-type zeolite which has even better durability and heat resistance that have not been obtained so far.

PRIOR-ART DOCUMENTS

Patent Documents

Patent Document 1: British Patent No. 868,846, description
Patent Document 2: U.S. Pat. No. 3,030,181, description
Patent Document 3: U.S. Pat. No. 4,544,538, description
Patent Document 4: U.S. Pat. No. 4,665,110, description
Patent Document 5: U.S. Pat. No. 6,709,644, description
Patent Document 6: JP-T-2007-534582
Patent Document 7: JP-A-60-92221
Patent Document 8: JP-A-5-78266
Patent Document 9: U.S. Pat. No. 6,488,741, description
Patent Document 10: JP-T-2005-503260
Patent Document 11: JP-A-8-59566
Patent Document 12: JP-A-9-124578
Patent Document 13: JP-T-2001-525241
Patent Document 14: JP-T-2002-512083

Non-Patent Documents

Non-Patent Document 1: *ATLAS OF ZEOLITE FRAMEWORK TYPES*, fifth revised edition, p. 102 (2001)
Non-Patent Document 2: *Nature*, Vol. 181, p. 1794 (1957)
Non-Patent Document 3: *Chem. Commun.*, p. 1881 (1998)

SUMMARY OF THE INVENTION

Problem that the Invention is to Solve

An object of the invention is to provide a chabazite-type zeolite which, when used as a catalyst support or adsorbent base material, has high durability and high thermal resistance and a process for producing the zeolite.

Means for Solving the Problem

The present inventors diligently made investigations on improvements in the durability and thermal resistance of chabazite-type zeolites and on processes for the production. As a result, the inventors have found that a chabazite-type zeolite having an $SiO_2/Al_2O_3$ molar ratio of 15-50 and an average particle diameter of 1.5 μm or more has high durability and thermal resistance and that such a chabazite-type zeolite can be produced under conditions different from conventional conditions, and the invention has been thus completed.

Essential points of the invention reside in the following (1) to (3).

(1) A chabazite-type zeolite characterized by having an $SiO_2/Al_2O_3$ molar ratio of 15-50 and an average particle diameter of 1.5 μm or more.

(2) A process for producing the chabazite-type zeolite according to (1) above, characterized in that a starting-material composition in which the molar ratios of a structure-directing agent and water to $SiO_2$ satisfy $0.05 \leq \text{(structure-directing agent)}/SiO_2 < 0.13$ and $5 \leq H_2O/SiO_2 < 30$ is crystallized in the presence of at least one kind of alkali metal ions selected from the group consisting of K, Rb, and Cs, and that
the structure-directing agent comprises at least one member selected from the group consisting of the hydroxides, halides, carbonates, methyl carbonates, and sulfates which each include an N,N,N-trialkyladamantylammonium as a cation and of the hydroxides, halides, carbonates, methyl carbonates, and sulfates which each include an N,N,N-trimethylbenzylammonium ion, an N-alkyl-3-quinuclidinol ion, or an N,N,N-trialkyl-2-ammonium exonorbornane as a cation.

(3) The process for chabazite-type zeolite production according to (2) above, characterized in that the structure-directing agent comprises at least one member selected from the group consisting of N,N,N-trialkyladamantylammonium hydroxide, N,N,N-trimethyladamantylammonium halides, N,N,N-trimethyladamantylammonium carbonate, N,N,N-trimethyladamantylammonium methyl carbonate, and N,N,N-trimethyladamantylammonium sulfate.

Effects of the Invention

The chabazite-type zeolite of the invention has the high durability and high thermal resistance which are required of catalyst supports and adsorbent base materials. Furthermore, the chabazite-type zeolite having high durability and thermal resistance can be produced using conditions under which an organic structure-directing agent, which is expensive, is used in a small amount.

MODES FOR CARRYING OUT THE INVENTION

Figure 1:
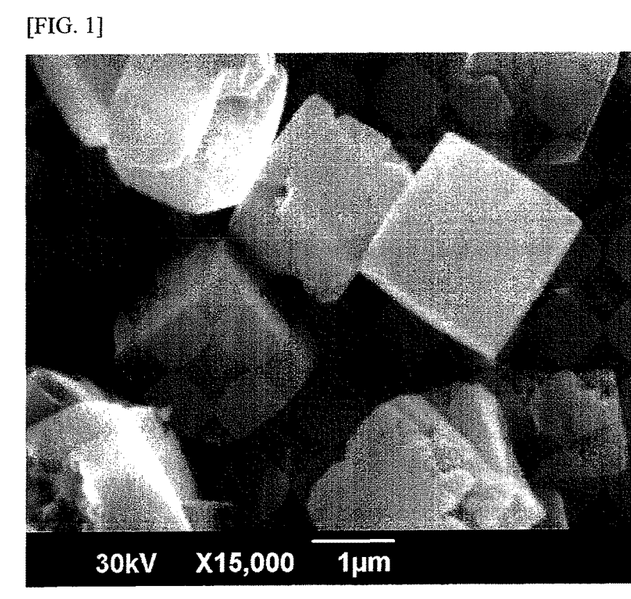
FIG. 1 is photograph of zeolite 3 taken with a scanning electron microscope (hereinafter referred to as "SEM").
Figure 2:
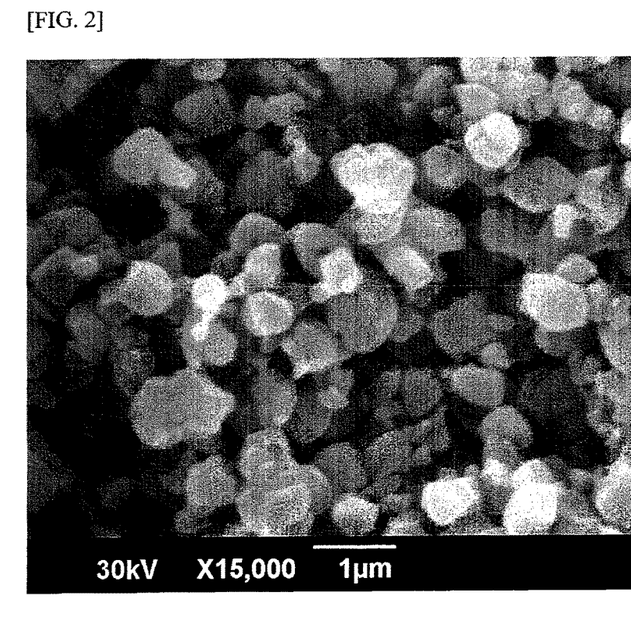
FIG. 2 is an SEM photograph of comparative zeolite 1.

The chabazite-type zeolite of the invention is high-silica chabazite having an $SiO_2/Al_2O_3$ molar ratio of 15-50. In the case where the $SiO_2/Al_2O_3$ molar ratio thereof is less than 15, the durability and thermal resistance which render the zeolite useful as an adsorbent or catalyst support are difficult to obtain. In the case where the $SiO_2/Al_2O_3$ ratio thereof exceeds 50, this zeolite is insufficient in solid acidity, which renders the zeolite useful as an adsorbent or catalyst support.

The chabazite-type zeolite of the invention should have an average particle diameter of 1.5 µm or more. From the standpoints of techniques for industrially producing the synthetic zeolite and of use of the zeolite as an adsorbent or catalyst support, it is preferred that the average particle diameter thereof should be 1.5 µm to 10 µm. Crystal particles smaller than 1.5 µm which have been reported, in particular, crystal particles smaller than 1.0 µm, have reduced durability and thermal resistance when used as an adsorbent or catalyst support.

Average particle diameter in the invention can be evaluated by a 10% particle diameter and a 50% particle diameter which are obtained through particle diameter distribution analysis (volumetric distribution) by the laser diffraction and scattering method, or through an observation with an SEM.

In the laser diffraction and scattering method, the zeolite is dispersed in water and this dispersion is subjected to a treatment in which the crystal particles are brought into a homogeneously dispersed state with an ultrasonic homogenizer, before being measured. Thus, the particle diameter can be determined with good reproducibility.

The chabazite-type zeolite of the invention has the crystal particle morphology in which the rhombohedral faces can be clearly observed. Consequently, the zeolite can be evaluated for particle diameter, for example, by arbitrarily selecting 50 crystal particle images from one or more SEM photographs taken at 5.000-fold magnifications, measuring the 50 crystal particle diameters thereof, and calculating a weighted average thereof. The chabazite-type zeolite of the invention is in the state of being dispersed as primary particles and, hence, there is a good correlation between the average particle diameter and the 10% particle diameter obtained through the particle diameter distribution analysis measurement by the laser diffraction and scattering method.

Next, the process for producing the chabazite-type zeolite of the invention is explained.

The chabazite-type zeolite of the invention is produced from starting materials which are composed basically of a silica source, an alumina source, an alkali source, a structure-directing agent (hereinafter referred to as "SDA"), and water. An ingredient having the function of accelerating crystallization, such as, e.g., seed crystals, may be added.

As the silica source, use can be made of colloidal silica, amorphous silica, sodium silicate, tetraethyl orthosilicate, an aluminosilicate gel, or the like. As the alumina source, use can be made of aluminum sulfate, sodium aluminate, aluminum hydroxide, aluminum chloride, an aluminosilicate gel, aluminum metal, or the like. It is desirable to use a silica source and an alumina source which are in such a form that they can be sufficiently evenly mixed with the other ingredients.

As the alkali source, use can be made of sodium hydroxide, potassium hydroxide, rubidium hydroxide, cesium hydroxide, the alkali components of an aluminate and silicate, the alkali component of an aluminosilicate gel, or the like.

As the SDA, use is made of at least one member selected from the group consisting of the hydroxides, halides, carbonates, methyl carbonates, and sulfates which each include an N,N,N-trialkyladamantylammonium as a cation and of the hydroxides, halides, carbonates, methyl carbonates, and sulfates which each include an N,N,N-trimethylbenzylammonium ion, an N-alkyl-3-quinuclidinol ion, or an N,N,N-trialkyl-2-ammonium exonorbornane as a cation.

In particular, as the SDA, use can be made of at least one member selected from the group consisting of N,N,N-trimethyladamantylammonium hydroxide (hereinafter abbreviated to "TMADAOH"), N,N,N-trimethyladamantylammonium halides, N,N,N-trimethyladamantylammonium carbonate, N,N,N-trimethyladamantylammonium methyl carbonate, and N,N,N-trimethyladamantylammonium sulfate.

The chabazite-type zeolite of the invention can be produced so that the $SDA/SiO_2$ ratio is 0.05 or greater but less than 0.13 and the $H_2O/SiO_2$ ratio is 5 or greater but less than 30.

In the case where the $SDA/SiO_2$ ratio is 0.13 or greater, the chabazite-type zeolite which can be obtained is limited to one having an average crystal particle diameter less than 1.5 µm as in conventional techniques. Furthermore, since the SDA is expensive, use of such a higher SDA/SiO$_2$ ratio is uneconomical. On the other hand, in the case where the SDA/SiO$_2$ ratio is less than 0.05, the crystallization of the chabazite-type zeolite is insufficient and by-products (impurities) are generated.

In the case where the H$_2$O/SiO$_2$ ratio is 30 or greater, the result is a reduced yield and the process is hence uneconomical. On the other hand, in the case where the H$_2$O/SiO$_2$ ratio is less than 5, the viscosity of starting material increased and hence results in no fluidity, making industrial production difficult. In either case, by-products (impurities and unreacted reactants) can be easily generated.

It is preferred that the starting-material composition in the invention should have an SiO$_2$/Al$_2$O$_3$ ratio of 16-100. In the case where the SiO$_2$/Al$_2$O$_3$ ratio is less than 16 or greater than 100, it is difficult to synthesize a chabazite-type zeolite having a SiO$_2$/Al$_2$O$_3$ ratio of 15-50.

The OH/SiO$_2$ ratio, which is an index to the amount of hydroxide ions, is preferably 0.1 or greater but less than 0.9, and is more preferably 0.15-0.5. In the case where the OH/SiO$_2$ ratio is less than 0.1, the crystallization of zeolite is difficult to proceed. In the case where the OH/SiO$_2$ ratio is 0.9 or greater, dissolution of the silica component is accelerated and, hence, it is difficult to obtain a chabazite-type zeolite having the SiO$_2$/Al$_2$O$_3$ ratio and particle diameter according to the invention.

When the chabazite-type zeolite of the invention is produced, the chabazite-type zeolite is crystallized in the presence of at least one element selected from the group consisting of K, Rb, and Cs, as alkali metal ions having the function of mineralizing. In the case where such alkali metal ions are not contained, crystallization proceeds insufficiently and by-products (impurity crystals) are generated, when the starting-material composition has an SDA/SiO$_2$ ratio less than 0.13. In addition, it is difficult to obtain a chabazite-type zeolite having an average particle diameter of 1.5 µm or more according to the invention. From the standpoint of economical rationality, K ions are preferred.

The starting-material composition constituted of water, a silica source, an alumina source, an alkali ingredient, and an SDA is crystallized at any desired temperature of 100-200° C. over a sufficiently long period in a closed vessel. Thus, the chabazite-type zeolite can be produced. During the crystallization, the starting-material composition may be allowed to remain static. It is, however, preferred that the starting-material composition should be kept being stirred and mixed. After completion of the crystallization, the resultant mixture is allowed to cool sufficiently and subjected to solid-liquid separation. The solid matter is washed with a sufficient amount of pure water and dried at any desired temperature of 100-150° C. Thus, a chabazite-type zeolite according to the invention is obtained.

The chabazite-type zeolite, as obtained, can be used as an adsorbent, a catalyst support, or an ion exchanger body. The chabazite-type zeolite obtained contains the SDA and/or the alkali metal within the pores, and can be used after these ingredients are removed according to need. For removing the SDA and/or the alkali metal, use can be made of a liquid-phase treatment with an acidic solution or with a chemical including an SDA-decomposing ingredient, an exchange treatment with a resin or the like, or thermal decomposition. A combination of these treatments may also be used. It is also possible to utilize the ion-exchange ability of the zeolite to convert the zeolite to the H form or NH$_4$ form before the zeolite is used. For this conversion, a known technique can be used.

EXAMPLES

The invention will be explained in detail by reference to the following Examples and Comparative Examples, but the invention should not be construed as being limited to the Examples.

Example 1

Production of Zeolite 1

To 21.3 g of a 13% aqueous solution of N,N,N-trimethyladamantylammonium hydroxide (hereinafter referred to as "13% aqueous TMADAOH solution") were added 17.4 g of pure water, 3.5 g of 48% aqueous potassium hydroxide solution, and 7.7 g of an amorphous aluminosilicate gel prepared from sodium silicate and aluminum sulfate, and the ingredients were sufficiently mixed together. The resultant starting-material composition was constituted of SiO$_2$: 0.036Al$_2$O$_3$:0.11TMADAOH:0.04Na$_2$O:0.13K$_2$O:18H$_2$O.

The starting-material composition was placed in a stainless-steel autoclave and heated at 150° C. for 158 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had SiO$_2$/Al$_2$O$_3$ ratio of 18.7. Pure water was added to this chabazite-type zeolite to prepare a slurry having a solid content of 1%. This slurry was subjected to an ultrasonic dispersion treatment for 2 minutes and then to particle diameter distribution analysis (volumetric average) by the laser diffraction and scattering method. As a result, the zeolite was found to have a 10% particle diameter of 1.35 µm and a 50% particle diameter of 1.93 µm. Furthermore, 50 crystal particle images were arbitrarily selected from an SEM photograph taken at 5,000-fold magnifications, and a particle diameter (hereinafter referred to as "SEM diameter") was obtained by averaging the diameters of those particles. The SEM diameter thereof was 1.64 µm. This chabazite-type zeolite is referred to as zeolite 1.

Example 2

Production of Zeolite 2

The same procedure as in Example 1 was conducted, except that an amorphous silica powder was used as a silica source and aluminum hydroxide was used as an alumina source.

To 22.1 g of 13% aqueous TMADAOH solution were added 18.4 g of pure water, 0.8 g of 48% aqueous sodium hydroxide solution, 3.6 g of 48% aqueous potassium hydroxide solution, 0.6 g of aluminum hydroxide, and 8.1 g of an amorphous silica powder (trade name: Nipsil VN-3) manufactured by Tosoh Silica Corp., and the ingredients were sufficiently mixed together.

This starting-material composition was placed in a closed stainless-steel autoclave and heated at 150° C. for 158 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an SiO$_2$/Al$_2$O$_3$ ratio of 19.5. This chabazite-type zeolite was subjected to particle diameter distribution analysis in the same manner as in Example 1. As a result, the zeolite was found to have a 10% particle diameter of 1.41 µm and a 50% particle diameter of 1.99 µm. The SEM diameter thereof was 1.65 µm. This chabazite-type zeolite is referred to as zeolite 2.

Example 3

Production of Zeolite 3

To 19.0 g of 13% aqueous TMADAOH solution were added 21.4 g of pure water, 1.7 g of 48% aqueous potassium hydroxide solution, and 7.9 g of an amorphous aluminosilicate gel prepared from sodium silicate and aluminum sulfate, and the ingredients were sufficiently mixed together. The resultant starting-material composition was constituted of $SiO_2:0.036Al_2O_3:0.10TMADAOH:0.04Na_2O:0.06K_2O:18H_2O$.

This starting-material composition was placed in a closed stainless-steel autoclave and heated at 150° C. for 158 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had $SiO_2/Al_2O_3$ ratio of 23.7.

In the following Table 1 is shown a comparison between an X-ray diffraction pattern of a chabazite-type zeolite (U.S. Pat. No. 4,544,538, description) and an X-ray diffraction pattern of the product obtained in Example 3.

TABLE 1

| X-ray diffraction pattern of chabazite-type zeolite (U.S. Pat. No. 4,544,538, description) | | X-ray diffraction pattern of the product of Example 3 (dried at 110° C.) | |
|---|---|---|---|
| Lattice spacing d (Å) | Relative intensity | Lattice spacing d (Å) | Relative intensity |
| 9.24 | 61 | 9.22 | 44 |
| 6.30 | 21 | 6.29 | 18 |
| 5.46 | 80 | 5.46 | 73 |
| 4.98 | 24 | 4.97 | 23 |
| 4.26 | 100 | 4.25 | 100 |
| 4.01 | 9 | 4.01 | 9 |
| 3.91 | 8 | 3.90 | 7 |
| 3.56 | 69 | 3.55 | 46 |
| 3.389 | 18 | 3.38 | 21 |
| 2.885 | 47 | 2.87 | 41 |
| 2.859 | 21 | 2.85 | 18 |

This chabazite-type zeolite was subjected to particle diameter distribution analysis in the same manner as in Example 1. As a result, the zeolite was found to have a 10% particle diameter of 1.83 µm and a 50% particle diameter of 3.09 µm. The SEM diameter thereof was 1.93 µm. This chabazite-type zeolite is referred to as zeolite 3.

Example 4

Production of Zeolite 4

To 16.0 g of 13% aqueous TMADAOH solution were added 24.7 g of pure water, 1.3 g of 48% aqueous potassium hydroxide solution, and 8.0 g of an amorphous aluminosilicate gel prepared from sodium silicate and aluminum sulfate, and the ingredients were sufficiently mixed together. The resultant starting-material composition was constituted of $SiO_2:0.036Al_2O_3:0.08TMADAOH:0.04Na_2O:0.04K_2O:18H_2O$.

This starting-material composition was placed in a closed stainless-steel autoclave and heated at 150° C. for 158 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an $SiO_2/Al_2O_3$ ratio of 25.2. This chabazite-type zeolite was subjected to particle diameter distribution analysis in the same manner as in Example 1. As a result, the zeolite was found to have a 10% particle diameter of 2.21 µm and a 50% particle diameter of 4.48 µm. The SEM diameter thereof was 2.08 µm. This chabazite-type zeolite is referred to as zeolite 4.

Example 5

Production of Zeolite 5

To 19.0 g of 13% aqueous TMADAOH solution were added 21.3 g of pure water, 2.0 g of 48% aqueous potassium hydroxide solution, and 7.7 g of an amorphous aluminosilicate gel prepared from sodium silicate and aluminum sulfate, and the ingredients were sufficiently mixed together. The resultant starting-material composition was constituted of $SiO_2:0.021Al_2O_3:0.10TMADAOH:0.04Na_2O:0.04K_2O:18H_2O$.

This starting-material composition was placed in a closed stainless-steel autoclave and heated at 150° C. for 70 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an $SiO_2/Al_2O_3$ ratio of 38.0. This chabazite-type zeolite was subjected to particle diameter distribution analysis in the same manner as in Example 1. As a result, the zeolite was found to have a 10% particle diameter of 2.02 µm and a 50% particle diameter of 3.75 µm. The SEM diameter thereof was 2.01 µm. This chabazite-type zeolite is referred to as zeolite 5.

Example 6

Production of Zeolite 6

To 18.9 g of 13% aqueous TMADAOH solution were added 20.7 g of pure water, 2.8 g of 48% aqueous potassium hydroxide solution, and 7.6 g of an amorphous aluminosilicate gel which had undergone a sodium removal treatment, and the ingredients were sufficiently mixed together. The resultant starting-material composition was constituted of $SiO_2:0.034Al_2O_3:0.10TMADAOH:0.10K_2O:18H_2O$.

This starting-material composition was placed in a closed stainless-steel autoclave and heated at 150° C. for 70 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an $SiO_2/Al_2O_3$ ratio of 25.4. This chabazite-type zeolite was subjected to particle diameter distribution analysis in the same manner as in Example 1. As a result, the zeolite was found to have a 10% particle diameter of 1.98 µm and a 50% particle diameter of 3.48 µm. The SEM diameter thereof was 1.92 µm. This chabazite-type zeolite is referred to as zeolite 6.

Example 7

Production of Zeolite 7

To 18.5 g of 13% aqueous TMADAOH solution were added 19.6 g of pure water, 4.3 g of 50% aqueous cesium hydroxide solution, and 7.7 g of an amorphous aluminosilicate gel prepared from sodium silicate and aluminum sulfate, and the ingredients were sufficiently mixed together. The resultant starting-material composition was constituted of $SiO_2$:$0.036Al_2O_3$:$0.10TMADAOH$:$0.04Na_2O$:$0.06Cs_2O$:$18H_2O$.

This starting-material composition was placed in a closed stainless-steel autoclave and heated at 150° C. for 182 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an $SiO_2$/$Al_2O_3$ ratio of 22.9. This chabazite-type zeolite was subjected to particle diameter distribution analysis in the same manner as in Example 1. As a result, the zeolite was found to have a 10% particle diameter of 2.17 µm and a 50% particle diameter of 4.22 µm. The SEM diameter thereof was 2.03 µm. This chabazite-type zeolite is referred to as zeolite 7.

Example 8

Production of Zeolite 8

To 10.6 g of a 25% aqueous solution of N,N,N-trimethyladamantylammonium bromide (hereinafter abbreviated to "TMADABr") were added 29.7 g of pure water, 1.7 g of 48% aqueous potassium hydroxide solution, 0.1 g of 48% aqueous sodium hydroxide solution, and 7.9 g of an amorphous aluminosilicate gel prepared from sodium silicate and aluminum sulfate, and the ingredients were sufficiently mixed together. The resultant starting-material composition was constituted of $SiO_2$:$0.034Al_2O_3$:$0.08TMADABr$:$0.05Na_2O$:$0.06K_2O$:$18H_2O$.

This starting-material composition was placed in a closed stainless-steel autoclave and heated at 150° C. for 70 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an $SiO_2$/$Al_2O_3$ ratio of 25.8. This chabazite-type zeolite was subjected to particle diameter distribution analysis in the same manner as in Example 1. As a result, the zeolite was found to have a 10% particle diameter of 2.29 µm and a 50% particle diameter of 5.78 µm. The SEM diameter thereof was 1.85 µm. This chabazite-type zeolite is referred to as zeolite 8.

Comparative Example 1

Production of Comparative Zeolite 1

A chabazite-type zeolite was synthesized with reference to the method disclosed in U.S. Pat. No. 4,665,110, description.

To 17.9 g of 13% aqueous TMADAOH solution were added 27.2 g of pure water, 0.9 g of 48% aqueous sodium hydroxide solution, 0.29 g of aluminum hydroxide, and 3.7 g of an amorphous silica powder (trade name: Nipsil VN-3) manufactured by Tosoh Silica Corp., and the ingredients were sufficiently mixed together. The resultant starting-material composition was constituted of $SiO_2$:$0.036Al_2O_3$:$0.20TMADAOH$:$0.10Na_2O$:$44H_2O$.

This starting-material composition was placed in a closed stainless-steel autoclave and heated at 150° C. for 158 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an $SiO_2$/$Al_2O_3$ ratio of 22.3. This chabazite-type zeolite was subjected to particle diameter distribution analysis in the same manner as in Example 1. As a result, the zeolite was found to have a 10% particle diameter of 0.71 µm and a 50% particle diameter of 1.25 µm. The SEM diameter thereof was 0.48 µm. This chabazite-type zeolite is referred to as comparative zeolite 1.

Comparative Example 2

Production of Comparative Zeolite 2

To 24.8 g of 13% aqueous TMADAOH solution were added 18.5 g of pure water, 1.2 g of 48% aqueous sodium hydroxide solution, 0.40 g of aluminum hydroxide, and 5.1 g of an amorphous silica powder (trade name: Nipsil VN-3) manufactured by Tosoh Silica Corp., and the ingredients were sufficiently mixed together. The resultant starting-material composition was constituted of $SiO_2$:$0.036Al_2O_3$:$0.20TMADAOH$:$0.10Na_2O$:$30H_2O$.

This starting-material composition was placed in a closed stainless-steel autoclave and heated at 150° C. for 158 hours. The product yielded through the heating was taken out by solid-liquid separation, washed with a sufficient amount of pure water, and dried at 110° C. X-ray powder diffractometry revealed that the product consisted only of an amorphous product.

Comparative Example 3

Production of Comparative Zeolite 3

To 24.6 g of 13% aqueous TMADAOH solution were added 14.7 g of pure water, 3.1 g of 48% aqueous sodium hydroxide solution, and 7.7 g of an amorphous aluminosilicate gel prepared from sodium silicate and aluminum sulfate, and the ingredients were sufficiently mixed together. The resultant starting-material composition was constituted of $SiO_2$:$0.035Al_2O_3$:$0.13TMADAOH$:$0.20Na_2O$:$18H_2O$.

This starting-material composition was placed in a closed stainless-steel autoclave and heated at 150° C. for 158 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an $SiO_2$/$Al_2O_3$ ratio of 18.5. This chabazite-type zeolite was subjected to particle diameter distribution analysis in the same manner as in Example 1. As a result, the zeolite was found to have a 10% particle diameter of 0.65 µm and a 50% particle diameter of 1.26 µm. The SEM diameter thereof was 0.39 µm. This chabazite-type zeolite is referred to as comparative zeolite 3.

Comparative Example 4

Production of Comparative Zeolite 4

To 21.5 g of 13% aqueous TMADAOH solution were added 18.1 g of pure water, 2.6 g of 48% aqueous sodium hydroxide solution, and 7.8 g of an amorphous aluminosilicate gel prepared from sodium silicate and aluminum sulfate, and the ingredients were sufficiently mixed together. The resultant starting-material composition was constituted of $SiO_2:0.035Al_2O_3:0.11TMADAOH:0.17Na_2O:18H_2O$.

This starting-material composition was placed in a closed stainless-steel autoclave and heated at 150° C. for 158 hours. The product yielded through the heating was taken out by solid-liquid separation, washed with a sufficient amount of pure water, and dried at 110° C. X-ray powder diffractometry revealed that the product consisted only of a mordenite-type zeolite.

Comparative Example 5

Production of Comparative Zeolite 5

To 22.0 g of 13% aqueous TMADAOH solution were added 18.6 g of pure water, 1.6 g of 48% aqueous sodium hydroxide solution, and 7.8 g of an amorphous aluminosilicate gel prepared from sodium silicate and aluminum sulfate, and the ingredients were sufficiently mixed together. The resultant starting-material composition was constituted of $SiO_2:0.035Al_2O_3:0.11TMADAOH:0.12Na_2O:18H_2O$.

This starting-material composition was placed in a closed stainless-steel autoclave and heated at 150° C. for 158 hours. The product yielded through the heating was taken out by solid-liquid separation, washed with a sufficient amount of pure water, and dried at 110° C. X-ray powder diffractometry and fluorescent X-ray spectroscopy revealed that the product was a pure chabazite-type zeolite and had an $SiO_2/Al_2O_3$ ratio of 24.2. This chabazite-type zeolite was subjected to particle diameter distribution analysis in the same manner as in Example 1. As a result, the zeolite was found to have a 10% particle diameter of 0.23 μm and a 50% particle diameter of 0.38 μm. The SEM diameter thereof was 0.18 μm. This chabazite-type zeolite is referred to as comparative zeolite 5.

Comparative Example 6

Production of Comparative Zeolite 6

To 19.1 g of 13% aqueous TMADAOH solution were added 21.8 g of pure water, 1.2 g of 48% aqueous sodium hydroxide solution, and 8.0 g of an amorphous aluminosilicate gel prepared from sodium silicate and aluminum sulfate, and the ingredients were sufficiently mixed together. The resultant starting-material composition was constituted of $SiO_2:0.036Al_2O_3:0.10TMADAOH:0.10Na_2O:18H_2O$.

This starting-material composition was placed in a closed stainless-steel autoclave and heated at 150° C. for 158 hours. The product yielded through the heating was taken out by solid-liquid separation, washed with a sufficient amount of pure water, and dried at 110° C. Powder X-ray diffraction and fluorescent X-ray spectroscopy revealed that the product was a pure chabazite-type zeolite and had an $SiO_2/Al_2O_3$ ratio of 24.4. This chabazite-type zeolite was subjected to particle diameter distribution analysis in the same manner as in Example 1. As a result, the zeolite was found to have a 10% particle diameter of 0.33 μm and a 50% particle diameter of 1.49 μm. The SEM diameter thereof was 0.32 μm. This chabazite-type zeolite is referred to as comparative zeolite 6.

In the following Table 2 are shown the starting-material compositions prepared in Examples 1 to 8 and Comparative Examples 1 to 6 and the products obtained therein. In Table 3 are shown the $SiO_2/Al_2O_3$ ratios of the products, the particle diameters thereof determined through particle diameter distribution analysis, and the particle diameters thereof determined from SEM photographs.

TABLE 2

| Example | $SiO_2/Al_2O_3$ ratio | (TMADAOH or TMADABr)/ $SiO_2$ Ratio | $H_2O/SiO_2$ ratio | Alkali metal | Product |
|---|---|---|---|---|---|
| Example 1 | 28 | 0.11 | 18 | Na, K | Chabazite |
| Example 2 | 28 | 0.11 | 18 | Na, K | Chabazite |
| Example 3 | 28 | 0.10 | 18 | Na, K | Chabazite |
| Example 4 | 28 | 0.08 | 18 | Na, K | Chabazite |
| Example 5 | 48 | 0.10 | 18 | Na, K | Chabazite |
| Example 6 | 29 | 0.10 | 18 | K | Chabazite |
| Example 7 | 28 | 0.10 | 18 | Na, Cs | Chabazite |
| Example 8 | 29 | 0.08 | 18 | Na, K | Chabazite |
| Comparative Example 1 | 28 | 0.20 | 44 | Na | Chabazite |
| Comparative Example 2 | 28 | 0.20 | 30 | Na | Amorphous |
| Comparative Example 3 | 29 | 0.13 | 18 | Na | Chabazite |
| Comparative Example 4 | 29 | 0.11 | 18 | Na | Mordenite |
| Comparative Example 5 | 29 | 0.11 | 18 | Na | Chabazite |
| Comparative Example 6 | 28 | 0.10 | 18 | Na | Chabazite |

TABLE 3

| Zeolite | $SiO_2/Al_2O_3$ ratio | 10% particle diameter (μm) | 50% particle diameter (μm) | SEM diameter (μm) |
|---|---|---|---|---|
| Zeolite 1 | 18.7 | 1.35 | 1.93 | 1.64 |
| Zeolite 2 | 19.5 | 1.42 | 1.99 | 1.65 |
| Zeolite 3 | 23.7 | 1.83 | 3.09 | 1.93 |
| Zeolite 4 | 25.2 | 2.21 | 4.48 | 2.08 |
| Zeolite 5 | 38.0 | 2.02 | 3.75 | 2.01 |
| Zeolite 6 | 25.4 | 1.98 | 3.48 | 1.92 |
| Zeolite 7 | 22.9 | 2.17 | 4.22 | 2.03 |
| Zeolite 8 | 25.8 | 2.29 | 5.78 | 1.85 |
| Comparative zeolite 1 | 22.3 | 0.71 | 1.25 | 0.48 |
| Comparative zeolite 3 | 18.5 | 0.65 | 1.26 | 0.39 |
| Comparative zeolite 5 | 24.2 | 0.23 | 0.38 | 0.18 |
| Comparative zeolite 6 | 24.4 | 0.33 | 1.49 | 0.32 |

Example 9

Hydrothermal Resistance Test of Zeolites

Dry powders of zeolite 3 and comparative zeolite 1 were calcined at 600° C. for 2 hours in an air stream. Thereafter, each powder was press-molded and then pulverized to obtain a powder regulated so as to be composed of 12- to 20-mesh particles. 3 ml of each zeolite having the regulated particle sizes was filled into an ordinary-pressure fixed-bed flow-through type reaction tube. While air containing 10% by volume moisture was being passed at 300 mL/min, the zeolite was treated at 900° C. for two levels of periods, i.e., 1 hour and 16 hours. The hydrothermal resistance of each zeolite was evaluated in terms of crystallinity as determined after the hydrothermal treatment. The crystallinity was determined by subjecting the zeolite to powder X-ray diffraction and calculating the ratio of the intensity of the diffraction peak appearing at d=4.25, as shown in Table 1, to the intensity thereof for the zeolite that had not undergone the hydrothermal treatment, which was taken as 100. In Table 4 is shown the values of crystallinity (%) of each zeolite which had undergone the hydrothermal treatment. The results show that the chabazite-type zeolite of the invention had higher retentions of crystallinity than the conventional chabazite-type zeolite and had excellent thermal resistance.

TABLE 4

| Zeolite | Crystallinity (%; relative to values for the untreated zeolites) | |
| --- | --- | --- |
|  | After 1-hour treatment at 900° C. | After 16-hour treatment at 900° C. |
| Zeolite 3 | 92 | 70 |
| Comparative zeolite 1 | 65 | 58 |

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 22, 2008 (Application No. 2008-325404), the contents thereof being incorporated herein by reference.

INDUSTRIAL APPLICABILITY

Since the chabazite-type zeolite of the invention has high durability and hydrothermal resistance, this zeolite is expected to be utilized in a wide range of fields as catalyst supports for exhaust gas purification catalysts and as the bases of adsorbents.

Consequently, the invention has a significant industrial value.

The invention claimed is:

1. A process for producing a chabazite-type zeolite having an $SiO_2/Al_2O_3$ molar ratio of 15-50 and an average crystal particle diameter of 1.5 μm or more, comprising crystallizing a starting-material composition in which the molar ratios of a structure-directing agent and water to $SiO_2$ satisfy $0.05 \leq$ (structure-directing agent)$/SiO_2 < 0.13$ and $5 \leq H_2O/SiO_2 < 30$ in the presence of at least one alkali metal ion selected from the group consisting of K, Rb, and Cs, and wherein the structure-directing agent comprises at least one member selected from the group consisting of the hydroxides, halides, carbonates, methyl carbonates, and sulfates which each include an N,N,N-trialkyladamantylammonium as a cation and of the hydroxides, halides, carbonates, methyl carbonate salts, and sulfates which each include an N,N,N-trimethylbenzylammonium ion, an N-alkyl-3-quinuclidinol ion, or an N,N,N-trialkyl-exo-aminonorbornane as a cation.

2. The process for producing the chabazite-type zeolite as claimed in claim 1, wherein the structure-directing agent comprises at least one member selected from the group consisting of N,N,N-trimethyladamantylammonium hydroxide, N,N,N-trimethyladamantylammonium halides, N,N,N-trimethyladamantylammonium carbonate, N,N,N-trimethyladamantylammonium methyl carbonate, and N,N,N-trimethyladamantylammonium sulfate.

3. The process for producing the chabazite-type zeolite as claimed in claim 1, wherein a starting-material composition in which the molar ratio of the water to $SiO_2$ satisfies $5 \leq H_2O/SiO_2 \leq 18$.

4. The process for producing the chabazite-type zeolite as claimed in claim 1, wherein the starting-material is crystallized in the presence of at least K.

5. The process for producing the chabazite-type zeolite as claimed in claim 1, wherein said crystallization further comprises crystallization of the starting-material in the presence of Na.

6. A process for producing a chabazite-type zeolite having an $SiO_2/Al_2O_3$ molar ratio of 15-50 and an average crystal particle diameter of 1.5 um or more, comprising crystallizing a starting-material composition in which the molar ratios of a structure-directing agent and water to $SiO_2$ and the molar ratio of $SiO_2/Al_2O_3$ satisfy $0.05 \leq$ (structure-directing agent)$/SiO_2 < 0.13$ and $5 \leq H_2O/SiO_2 < 30$ $16 \leq SiO_2/Al_2O_3 \leq 100$ in the presence of at least one alkali metal ion selected from the group consisting of K, Rb, and Cs, and wherein the structure-directing agent comprises at least one member selected from the group consisting of the hydroxides, halides, carbonates, methyl carbonates, and sulfates which each include an N,N,N-trialkyladamantylammonium as a cation and of the hydroxides, halides, carbonates, methyl carbonate salts, and sulfates which each include an N,N,N-trimethylbenzylammonium ion, an N-alkyl-3-quinuclidinol ion, or an N,N,N-trialkyl-exo-aminonorbornane as a cation.

* * * * *

UNITED STATES PATENT AND TRADEMARK OFFICE
CERTIFICATE OF CORRECTION

PATENT NO. : 10,029,247 B2
APPLICATION NO. : 13/139591
DATED : July 24, 2018
INVENTOR(S) : Ariga et al.

Page 1 of 1

It is certified that error appears in the above-identified patent and that said Letters Patent is hereby corrected as shown below:

On the Title Page

Item (57), second column, Line 2, change "that is expected to have" to --that has--.

Item (57), second column, Line 2, change "thermal" to --hydrothermal--.

Item (57), second column, Line 7, change "thermal" to --hydrothermal--.

Signed and Sealed this
Twenty-sixth Day of March, 2019

Andrei Iancu
*Director of the United States Patent and Trademark Office*